(12) United States Patent  (10) Patent No.: US 7,887,702 B2
Park et al.  (45) Date of Patent: Feb. 15, 2011

(54) FILTERING APPARATUS EMPLOYING THE ROTOR FOR MULTISTAGE GENERATING VARIABLE VORTEX FLOW

(75) Inventors: Gi Taek Park, Daejeon (KR); Sang Wook Kim, Chung-Nam (KR); Dong-Woo Kim, Seoul (KR)

(73) Assignee: Boo-Kang Tech Co., Ltd., Seoul (KR)

( * ) Notice: Subject to any disclaimer, the term of this patent is extended or adjusted under 35 U.S.C. 154(b) by 304 days.

(21) Appl. No.: 12/177,147

(22) Filed: Jul. 21, 2008

(65) Prior Publication Data

US 2009/0145833 A1 Jun. 11, 2009

(51) Int. Cl.
*B01D 63/16* (2006.01)
*B01D 61/00* (2006.01)

(52) U.S. Cl. .................. 210/321.63; 210/787; 210/788; 210/789; 210/619; 210/784; 210/107; 210/145; 210/211; 210/213; 210/272; 210/321.68; 210/374; 210/380.1; 210/415

(58) Field of Classification Search ........................ None
See application file for complete search history.

(56) References Cited

U.S. PATENT DOCUMENTS

| 3,812,967 | A | * | 5/1974 | Rudzinski | 210/174 |
| 4,066,546 | A | * | 1/1978 | Sasaki | 210/660 |
| 4,312,756 | A | * | 1/1982 | Hug | 210/330 |
| 4,724,076 | A | * | 2/1988 | Deguchi et al. | 210/360.2 |
| 5,925,247 | A | * | 7/1999 | Huebbel | 210/321.75 |
| 5,925,249 | A | * | 7/1999 | Fredriksson | 210/415 |
| 5,993,674 | A | * | 11/1999 | Rolchigo et al. | 210/780 |
| 6,027,656 | A | * | 2/2000 | Henttonen et al. | 210/767 |
| 6,165,365 | A | * | 12/2000 | Salyer et al. | 210/650 |
| 6,613,231 | B1 | * | 9/2003 | Jitariouk | 210/650 |
| 7,666,305 | B2 | * | 2/2010 | Park et al. | 210/321.63 |
| 2005/0224426 | A1 | * | 10/2005 | Arefjord | 210/787 |
| 2007/0144956 | A1 | * | 6/2007 | Park et al. | 210/330 |

FOREIGN PATENT DOCUMENTS

WO  WO 95/16508  * 6/1995

* cited by examiner

*Primary Examiner*—Krishnan S Menon
(74) *Attorney, Agent, or Firm*—LRK Patent Law Firm

(57) ABSTRACT

A filtering apparatus is provided for filtering raw water containing various impurities and mixtures into purified water, and more particularly, a multistage filtering apparatus is provided in which a rotor for generating vortex are installed in each of multiple layers of filtration membrane stacked within a closed barrel and the rotors are formed in multistage by having different diameter of each rotor so that the power for generating vortex can be remarkably minimized by generating the vertical vortex from top and bottom of the rotary rotor and the horizontal vortex from the outer side of circumference plate of the rotary rotor to be crossed over between membranes to prevent from blocking the pores or remove the deposited pollutants, and the closed-type barrel having multistage of membranes, rotary shaft, and rotary rotors for vortex generation within are constructed as a single module of filter pack, and the filter pack is connected and extended in accordance with required purified capacity so that large scale installation of filtering apparatus is possible.

7 Claims, 9 Drawing Sheets

<a>

<b>

FILTERING APPARATUS EMPLOYING THE ROTOR FOR MULTISTAGE GENERATING VARIABLE VORTEX FLOW

CROSS-REFERENCE TO RELATED APPLICATIONS

The benefit of priority is claimed to Republic of Korea patent application number 10-2007-0127933, filed Dec. 11, 2007, and also to Republic of Korea patent application number 10-2008-0049642, filed May 27, 2008, both of which are incorporated by reference herein in their entireties.

INTRODUCTION

The present invention relates to a filtering apparatus for filtering raw water containing various impurities and mixtures into purified water, and more particularly to a multistage filtering apparatus in which a rotor for generating vortex is installed in each of multiple layers of filtration membrane stacked within a closed barrel, in which the rotors are provided in multistage arrangement by having different diameters for each rotor so that the power required for generating a vortex can be minimized.

BACKGROUND

In general, a filtering apparatus for filtering raw water containing pollutants, such as various impurities, mixtures, or the like, or mixed materials into clear purified/treated water, has a membrane filter (hereinafter, referred to as "membrane") having many minute pores.

Therefore, if the raw water containing various pollutants flows into the filtering apparatus, the polluted raw water is purified by passing through the membrane installed within the filtering apparatus and various pollutants failing to passing through the membrane are accumulated and concentrated in the membrane, however, if the density of concentrated pollutants reaches certain amount, the water containing pollutants are discharged to the concentrated water outlet by a separate signal system.

The pollutants accumulated and concentrated in the membrane block the pores of the membrane so as to deteriorate the purification performance of the membrane in certain periods, thereby causing a need for replacement. Therefore, a provision for removing the pollutants deposited in the membrane is installed in the membrane in such a manner that the filtering performance of the membrane can be maintained for a long time.

In the apparatus for removing the pollutants deposited in the membrane and maintaining the filtering performance, a variety of technologies has been disclosed. Among these technologies, the applicant's related work, "Closed-type waste water treatment apparatus employing ultrasonic vibrator" is disclosed in Korean patent publication No. 10-2007-0106192, published Nov. 1, 2007, which is hereby incorporated by reference in its entirety.

The following is a brief summary of the applicant's related work.

If the raw water containing the pollutants inflows, pure water contained in the polluted raw water passes and is filtered through the pores of a membrane, filtered purified/treated water is discharged to a purified/treated water outlet, and the raw water containing the pollutants is concentrated for predetermined periods so as to be discharged to a concentrated water outlet. Further, the impurities adhere to the pores of the membrane due to filtering the raw water containing the pollutants receives the power (energy, shearing stresses) of the vortex generated by the rotation of a vortex generation rotor installed in a driving shaft, so that the vortex prevents the impurities from blocking the pores, thereby maintaining the filtering performance.

As illustrated in FIG. 8 and FIG. 9, the conventional filtering apparatus 50 consists of a barrel 51 having a closed space within, a plurality of membranes 52 installed in an inner wall of the barrel 51 to filter the pollutant, a vortex generation rotor 55 alternatively arranged with the membranes and installed by a rotary shaft 54 rotated by a driving motor 53 to generate vortex to be rotated with the rotary shaft 54, a raw water inlet 56 through which raw water containing impurities is introduced into the barrel 51, a purified water outlet 57 through which treated water filtered by the membranes is discharged, and a concentrated water outlet 58 through which the water containing various pollutants failing to passing through the membrane 52 and accumulated and concentrated in the barrel 51 is discharged.

In the filtering apparatus 50 of state of the art, the rotary shaft 54 is rotated by the driving motor 53 when raw water containing various impurities inflows to a raw water inlet 56. The vortex generation rotors 55 are rotated by the rotary shaft 54 and stir the raw water so as to remove the solid matter, such as impurities, or the like, deposited on the surfaces of the membranes 52 in order to maximize the functionality of the membranes 52.

Moreover, if the raw water continues to flow into the barrel 51, the various pollutants failing to passing through the membrane are accumulated and concentrated in the membrane for predetermined periods so as to be discharged to the outside.

As mentioned above, the shape of the filtering apparatus 50 of state of the art is formed to be installed perpendicular to the ground so that the filtering apparatus 50 of perpendicular shape has to be formed under certain fixed height. It is because there will be limitation of height in the place to be installed, impossible to install as duplex structure for large scale installation, or possibility for falling down if the filtering apparatus 50 is installed too high.

Another problem of the said filtering apparatus 50 is that if the filtering apparatus is installed in certain height and the diameter of the vortex generation rotor 55 is set to be over certain size in order to form in large scale, the diameter of the membranes 52 or the rotors 55 becomes large so that the membranes 52 or the rotors 55 become over weight. Therefore, the membranes 52 or the rotors 55 can be bent or drooped so as to deteriorate the filtering functionality and consequently there will be limitations to form large scales of filtering apparatus.

Moreover, there is another problem of the filtering apparatus that the diameter of the rotor 55 installed around the raw water inlet 56 and the diameter of the rotor installed around the concentrated water outlet where the density of concentrated water is maximized are the same. That is, it is not necessary to waste the driving power by having the same size for the rotors of raw water inlet 56 and concentrated water outlet 58 because the pollution density of raw water in the raw water inlet 56 is much lower than in the concentrated water outlet 58. Thus, it is waste of power to collectively operate the driving motor with the same intensity and it is not necessary to have the same size for rotors in raw water inlet and outlet. The reason that the density of raw water becomes higher in the concentrated water outlet 58 than in the raw water inlet 56 is because the raw water is filtered one by one from the membranes 52 and pure water is discharged.

SUMMARY

Therefore, the present invention has been made in view of the above-mentioned problems occurring in the prior art, and the present invention provides a filtering apparatus employing the multistage rotor generating variable vortex flow, in which the filtering apparatus is formed in horizontal shape rather than perpendicular shape of the filtering apparatus in the prior art, with forming fixed size of filter packs as single unified module in order to connect a number of filter packs depending on the purified capacity of the raw water for large scale installation. It is another object of the present invention to provide the filtering apparatus employing the multistage rotor generating variable vortex flow to enhance the massiveness and operating efficiency of the filtering apparatus by having different pollution levels of the raw water depends on the sizes of the vortex generation rotors for reducing driving power to rotate the rotors, and to simultaneously generate horizontal and vertical vortex by changing the shape of rotor for reducing the power.

According to an aspect of the present invention, there is provided a filtering apparatus employing the multistage rotor generating variable vortex flow including: a closed-type barrel having left lid unit and right lid unit; a plurality of membranes installed in an inner wall of the barrel by a predetermined distance; a rotary shaft installed in a central portion of the barrel and rotated by a driving motor; a plurality of rotary rotors installed in the rotary shaft by a predetermined distance; a raw water inlet through which raw water containing impurities is introduced; a purified water outlet through which treated water filtered in the barrel is discharged; a concentrated water outlet through which concentrated waste water containing impurities deposited is discharged; a supporting bracket to prevent the rotary shaft from bending or drooping.

According to an aspect of the present invention, there is provided a filtering apparatus employing the multistage rotor generating variable vortex flow wherein the closed-type barrel is installed in horizontal; each of the membranes and rotary rotors is installed perpendicular to the ground; the rotary rotors are alternatively arranged with the membranes from the left lid unit, where the raw water inlet is installed to the right lid unit, where the concentrated water outlet is installed to form multistage of rotary rotors.

According to the present invention, it is advantageous that the rotary rotor smaller than the diameter of the membrane is installed in order to generate not only the vertical vortex phenomenon in between membranes installed on the top and bottom of rotary rotor but also horizontal vortex to the outer direction of rotary rotor (direction of centrifugal force) rather than the structure of rotary rotor in the prior art is installed on the top and bottom of the membranes with same size to generate single direction of vertical crossing at right angles to each membrane, and consequently, vertical and horizontal vortex are generated and crossed over in a single rotor.

According to the present invention, it is advantageous that the closed-type barrel having multistage of membranes, rotary shaft, and rotary rotors for vortex generation within are constructed as a single module of filter pack, and the filter pack is connected and extended in accordance with required purified capacity so that large scale installation of filtering apparatus is possible.

According to the present invention of a filtering apparatus employing the multistage rotor generating variable vortex flow, the cost of power supply and production for operating rotary shaft can be minimized by installing multistage of vortex generation rotor wherein the smallest diameter of rotary rotor is installed in the raw water inlet through which the raw water inflows and the diameter of rotary rotor is gradually increased towards the concentrated water outlet, where pollution density becomes higher, vortex efficiency can be maximized by applying the rotor where horizontal and vertical vortex are simultaneously generated, and the large scale installation is simple based on the change of purified capacity of the raw water by using the filter pack with unified module so that the efficiency can be optimized to form the filtering apparatus with optimized purified capacity.

BRIEF DESCRIPTION OF THE DRAWINGS

The foregoing and other objects, features and advantages will be more apparent from the following detailed description when taken in conjunction with the following.

DETAILED DESCRIPTION

Figure 1:
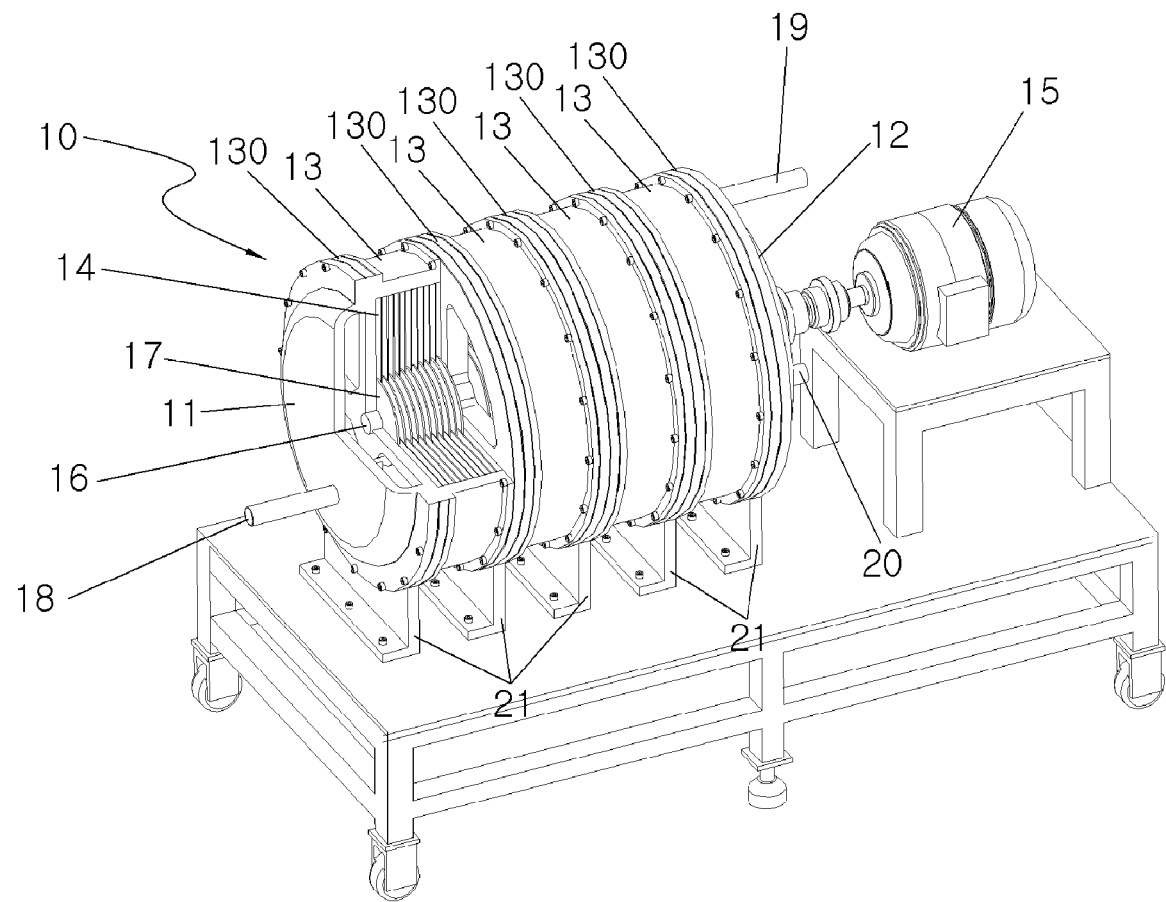
FIG. 1 is a perspective view with a partial vertical perspective view schematically illustrating a filtering apparatus employing the multistage rotor generating variable vortex flow according to the present invention.

Reference will now be made in detail to example embodiments of the present discussion. FIG. 1 is a perspective view illustrating a filtering apparatus with a partial vertical perspective view of internal structure according to the present invention and FIG. 2 is a schematic sectional view of FIG. 1.

Figure 2:
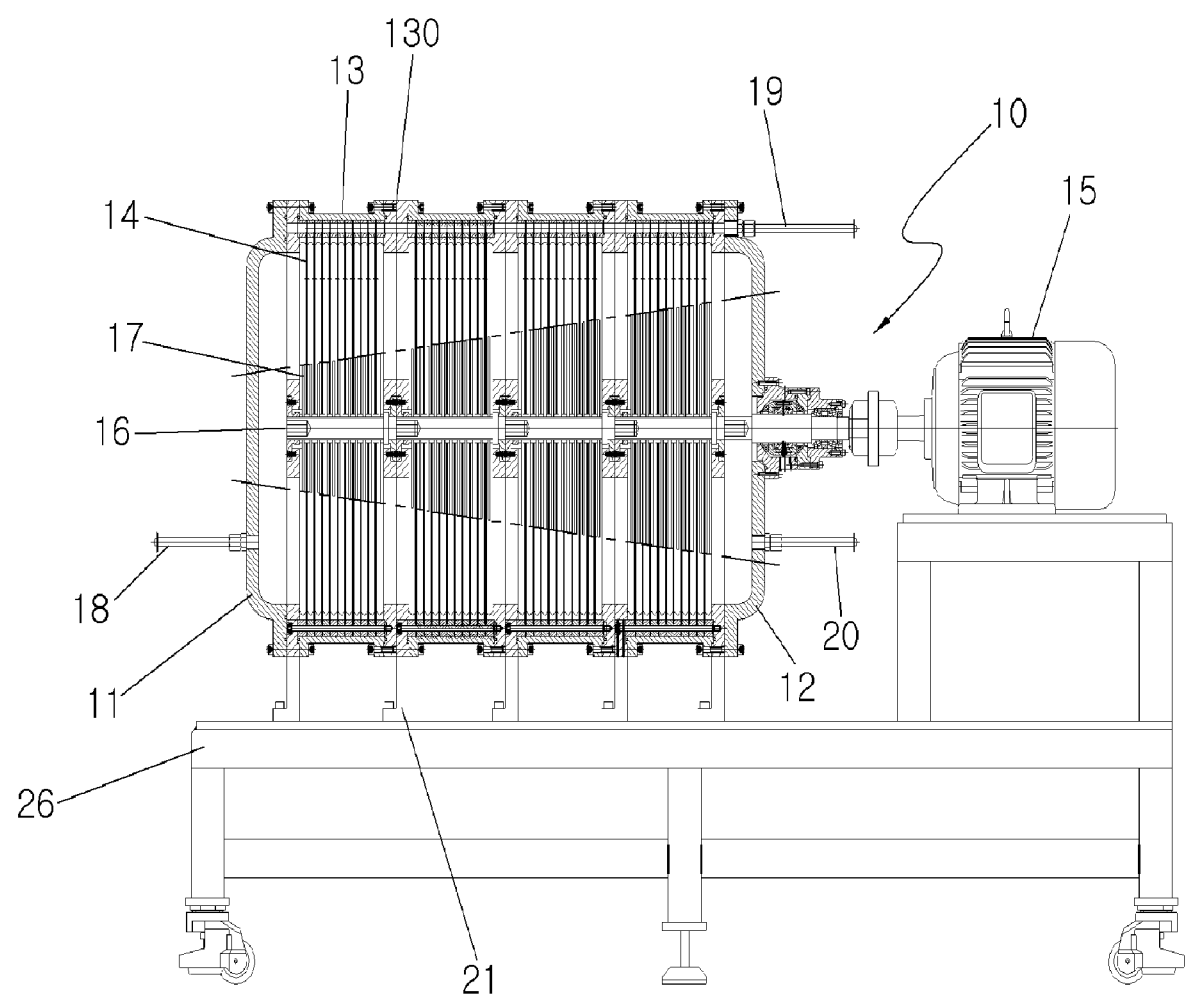
FIG. 2 is a schematic sectional view illustrating a filtering apparatus employing the multistage rotor generating variable vortex flow according to the present invention.

As illustrated in FIG. 1 and FIG. 2, a filtering apparatus employing the rotor for multistage generating variable vortex flow 10 of the present invention includes a barrel 13 having a left lid unit 11 and a right lid unit 12 connected to a coupler 130 therein and forming a body of the filtering apparatus employing the multistage rotor generating variable vortex flow 10, a plate-type, porous membrane 14 installed in an inner wall of the barrel 13 by a predetermined distance to filter the polluted raw water, a rotary shaft 16 installed in a central portion of the barrel 13, a rotary rotor 17 installed in the rotary shaft 16 by a predetermined distance and alternatively arranged with the membrane 14 to generate vortex, a raw water inlet 18 installed in the left lid unit through which the raw water containing pollutants is introduced, a purified water outlet 19 installed in the right lid unit through which purified water is discharged, a concentrated water outlet 20 installed in the right lid unit through which concentrated water is discharged, a supporting bracket 21 installed by a predetermined distance to prevent the rotary shaft 16 from bending or drooping, and a subsidiary bracket 21a to support the barrel 13.

As illustrated in FIG. 2, the rotary rotor 17 for generating vortex is alternatively arranged with the membranes 14 from the left lid unit 11, where the raw water inlet 18 is installed, to the right lid unit 12, where the concentrated water outlet 20 is installed to form multistage of rotary rotors wherein the diameter of rotary rotor is gradually increased. It is because the pollution density of raw water in the raw water inlet 18 is low and gradually increased towards the concentrated water outlet 20 so that the level of deposited pollutants is much higher in the membrane 14 located closer to the concentrated water outlet 20. Therefore, the diameter of rotary rotor 17 has to be gradually increased towards the concentrated water outlet because the vortex force to remove the deposited pollutants has to be also gradually increased towards the concentrated water outlet 20.

Figure 4:
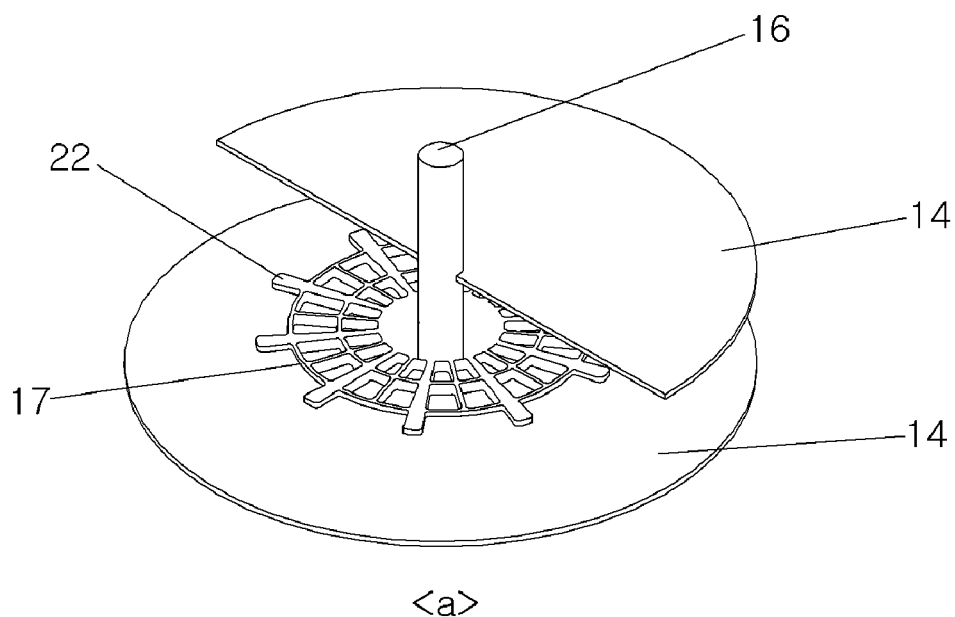
FIG. 4 is a magnified view illustrating a rotary rotor applied in a filtering apparatus employing the multistage rotor generating variable vortex flow according to the present invention.
Figure 4:
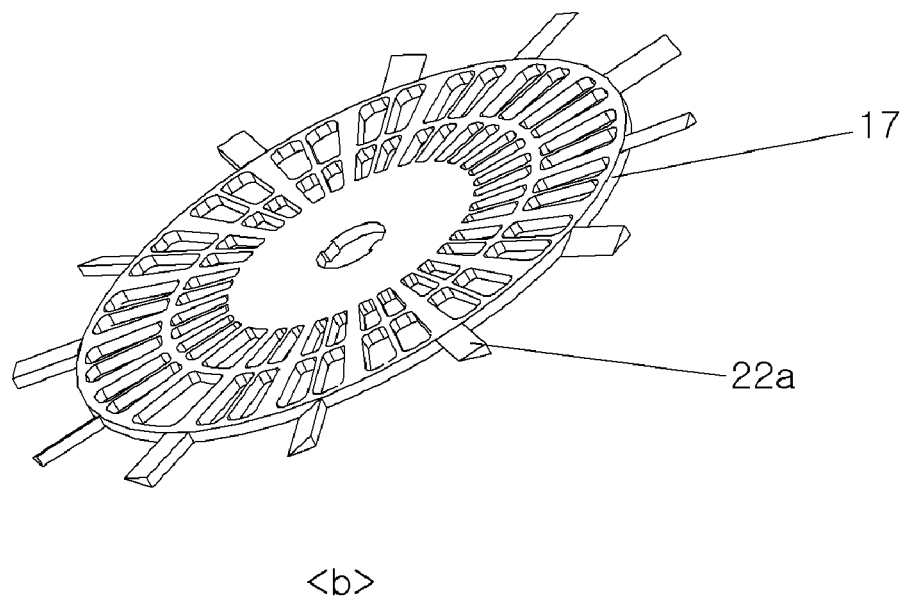

Furthermore, in outer direction of each rotary rotor 17 as illustrated in FIG 4<a>, a plurality of rectangular vortex generating projection 22 is formed in predetermined distance so that when the rotary rotor 17 is rotated by the vortex generating projection, the more and large number of vortex is generated towards direction of centrifugal force, and consequently the vortex force is transferred to the pollutants in raw water in between each membrane 14, wherein its diameter is larger than of the rotary rotor 17 to prevent from blocking the pores or remove the deposited pollutants.

Figure 6:
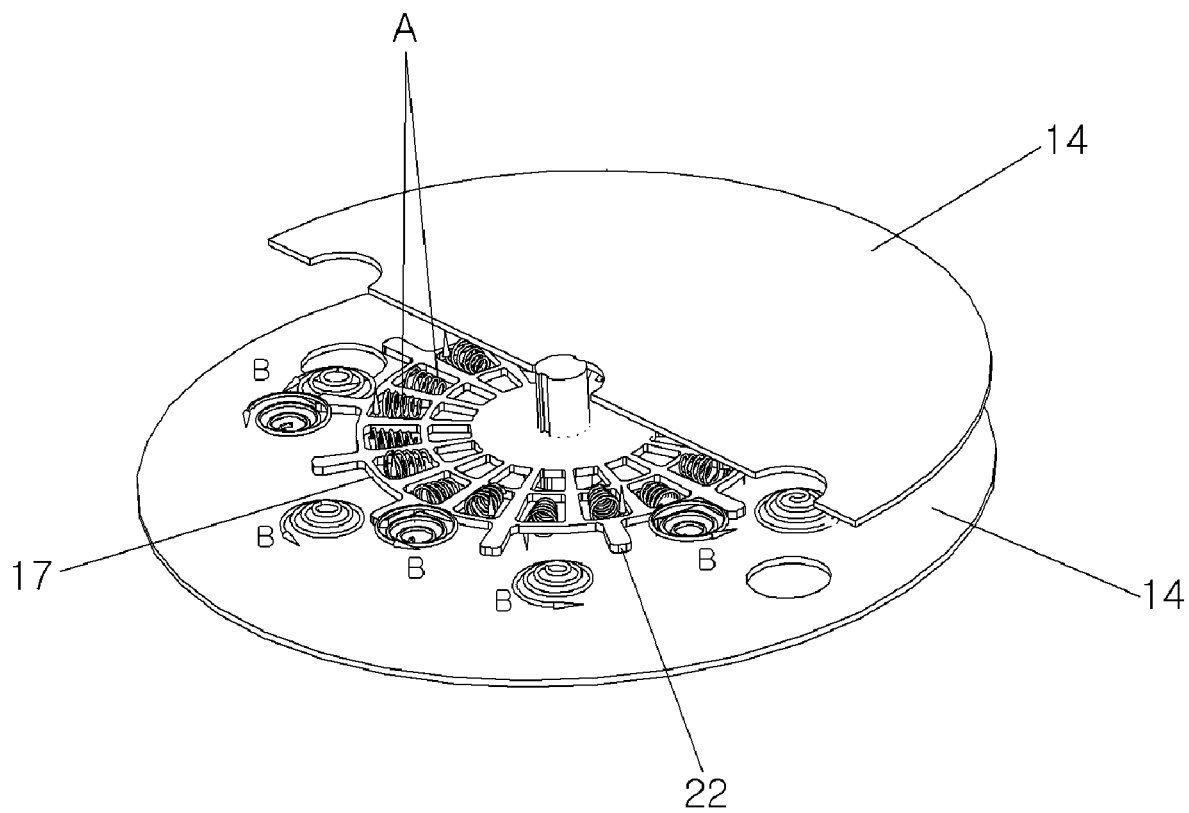
FIG. 6 is a perspective view illustrating the principles of horizontal and vertical vortex generation by a rotary rotor installed in between membranes.

As illustrated in FIG. 6, each rotary rotor 17 in between the membranes 14 has smaller diameter than of membranes 14, and the rotary rotor 17 is rotated in between membranes 14. However, the vortex is generated by rotary power from the rotary rotor 17 in between top and bottom sections of the rotary rotor 17 and between each membranes 14 so that the vortex is generated perpendicular to each membrane 14 and it is called a vertical vortex (A). On the other hands, the vortex is generated towards direction of centrifugal force in between each membrane located outer direction of rotary rotor 17 so that the vortex is generated horizontal to each membrane 14 and the rotary rotor 17 and it is called a horizontal vortex (B).

Furthermore, the rectangular vortex generating projection 22 in outer direction of each rotary rotor 17 as illustrated in FIG. 4<a> can be replaced by triangular vortex generating projection 22a. However, a plurality of triangular vortex generating projection 22a can be installed on circumference surface alternatively arranged to have one side of triangle faces top and another side faces down.

Thus, the vertical vortex generated from top and bottom of the rotary rotor 17 and the horizontal vortex generated from the outer side of circumference plate of the rotary rotor 17 are crossed over between membranes to prevent from blocking the pores or remove the deposited pollutants.

Figure 3:
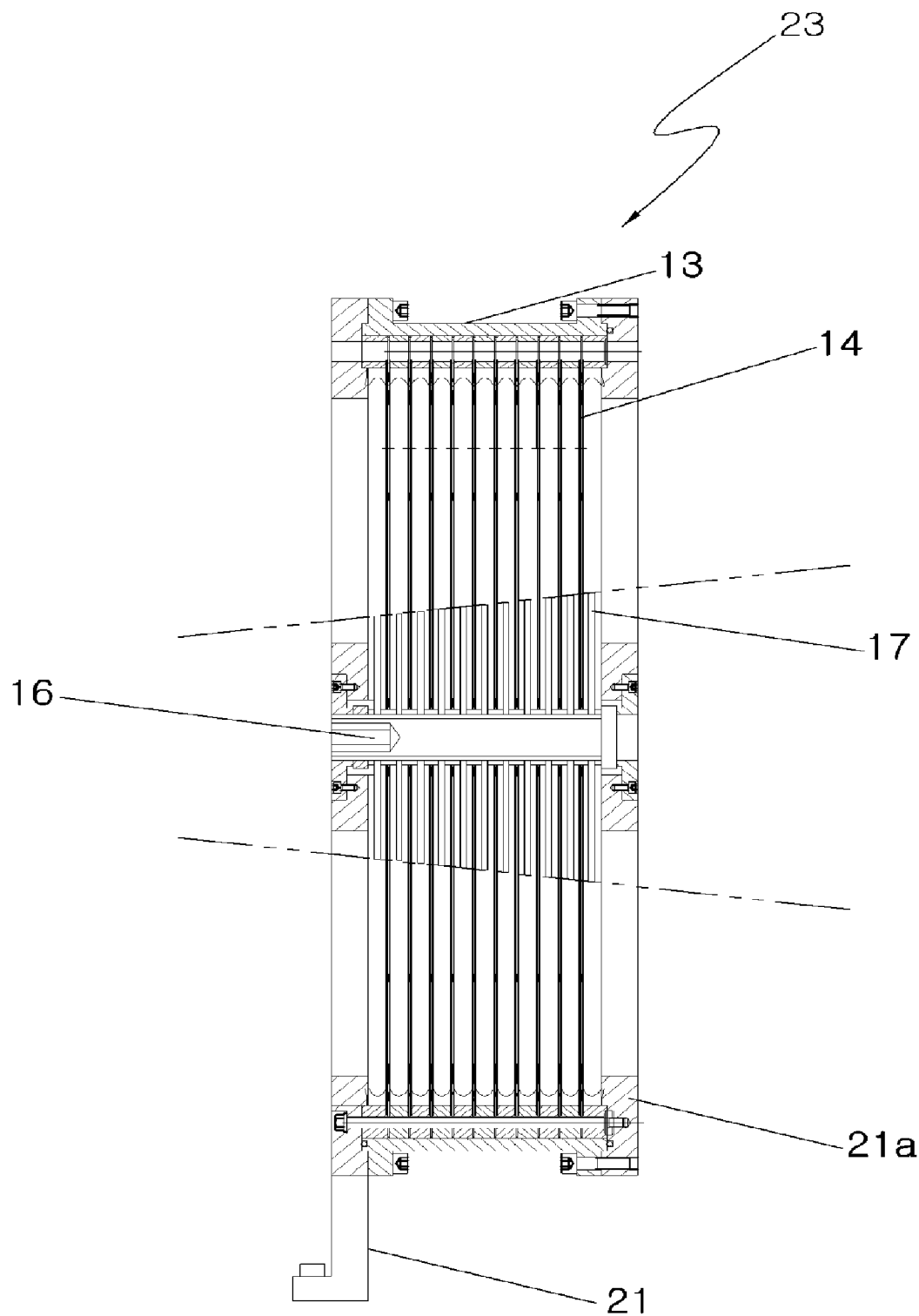
FIG. 3 is a schematic sectional view illustrating a filter pack according to the present invention.

In a filtering apparatus employing the multistage rotor generating variable vortex flow 10 as illustrated in FIG. 3, a filter pack 23 is comprised as a single unified module compositing a supporting bracket 21, a subsidiary bracket 21a, a rotary shaft 16, rotary rotor 17, a membrane 14, and a barrel 13 and can be installed as multistage so that the filtering apparatus with required capacity can be installed depending on the purified capacity of pollutants. That is, the filtering apparatus 10 can be installed by extendedly connecting a number of filter packs 23 as multistage.

However, the close-type barrel 13 forming a body of the filter apparatus, the membrane 14, the rotary rotor 17, and the rotary shaft 16 are installed horizontal to the ground due to the large scale installation of the filtering apparatus 10.

The filtering apparatus employing the multistage rotor generating variable vortex flow 10 can be installed in large scale of capacity by using coupler 130 to consecutively connect the filter packs 23 in order to extend the filtering apparatus. However, the coupling each rotary shaft 16 installed inside of the filter pack 23 can be done by having a coupling part as request type or using other coupling mechanisms.

Figure 5:
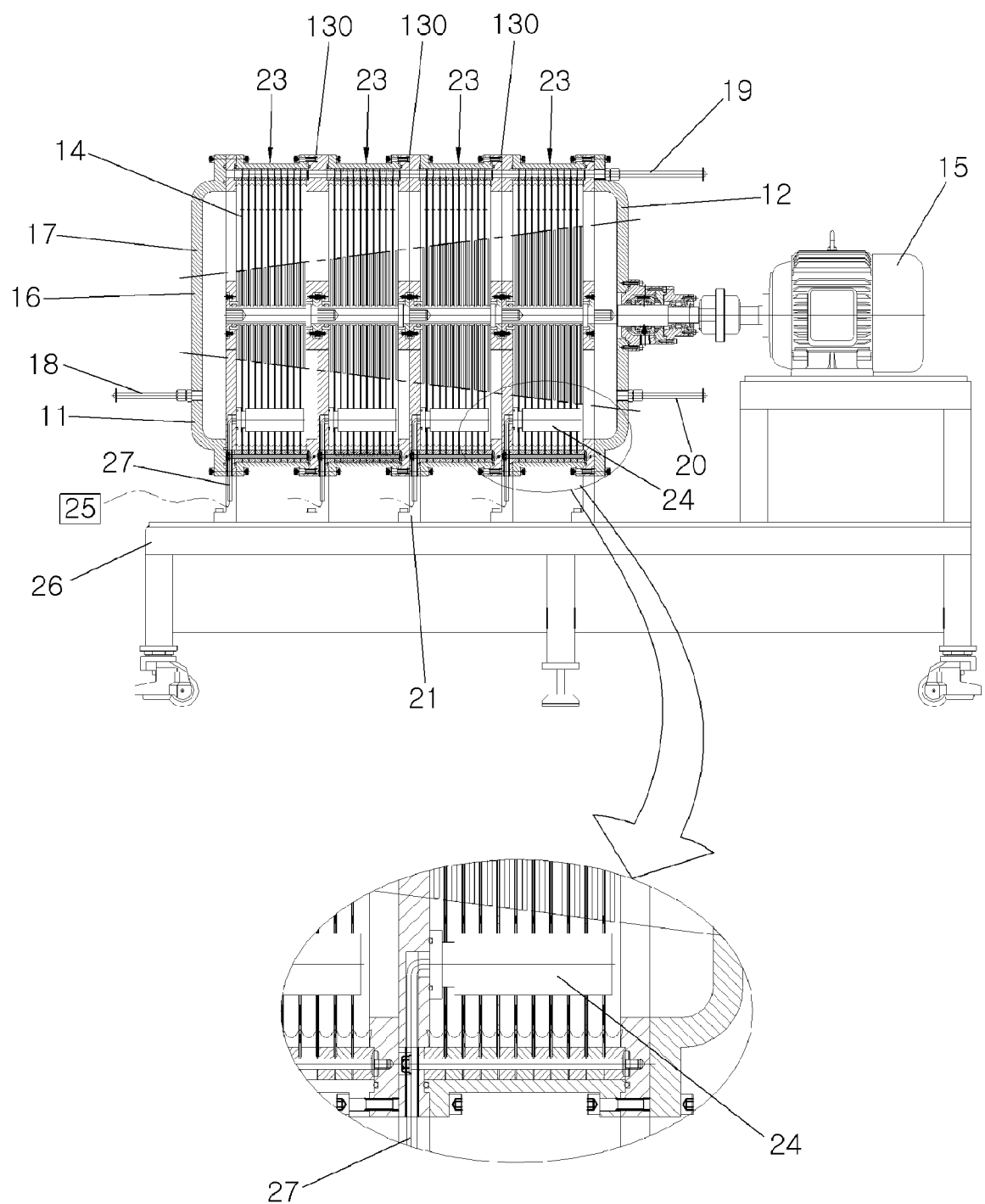
FIG. 5 is a schematic sectional view illustrating a filtering apparatus employing the multistage rotor generating variable vortex flow according to an exemplary embodiment of the present invention.

FIG. 5 illustrates a schematic sectional view of a filtering apparatus employing the multistage rotor generating variable vortex flow 10 according to an exemplary embodiment of the present invention. In FIG. 5, an ultrasonic vibrator 24 is installed in the filter pack 23 by passing through the membrane 14, and the ultrasonic vibrator 24 is operated when the ultrasonic wave from separate ultrasonic oscillator passes through a service wire line 27 penetrated and installed inside the supporting bracket 21.

Figure 7:
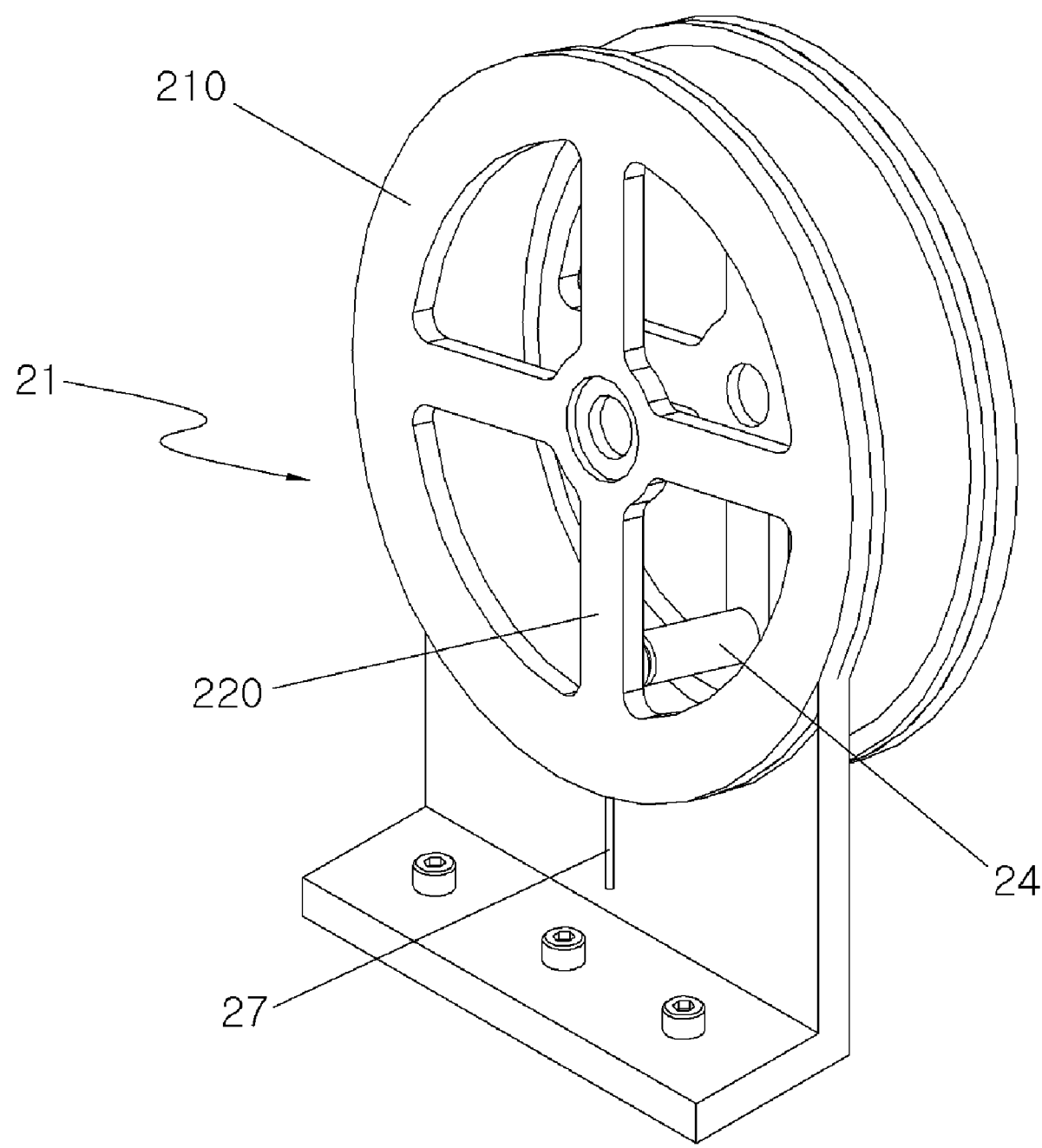
FIG. 7 is a conceptual view illustrating a supporting bracket to support a rotary shaft.
Figure 8:
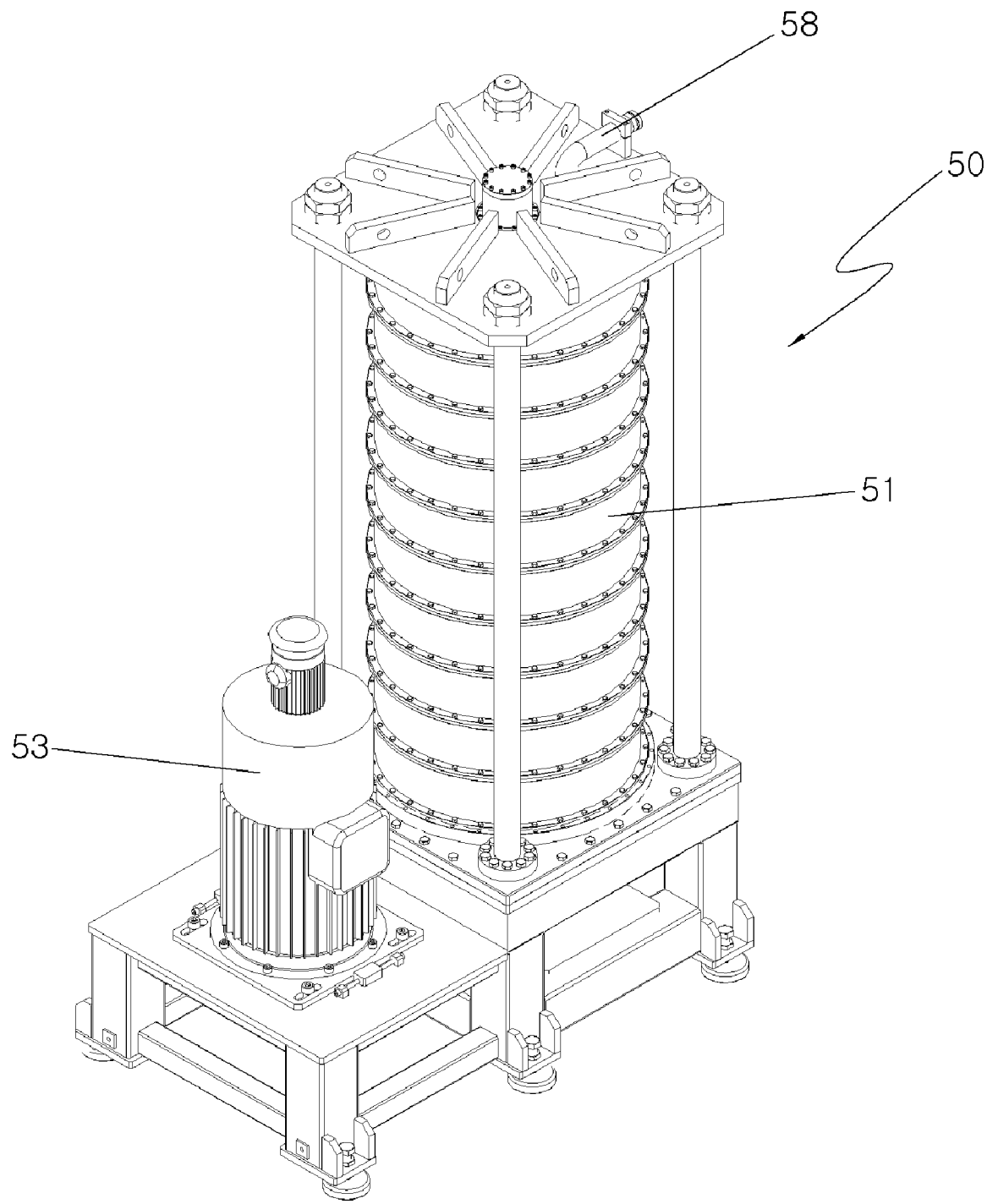
FIG. 8 is a perspective view illustrating a filtering apparatus of the prior art.
Figure 9:
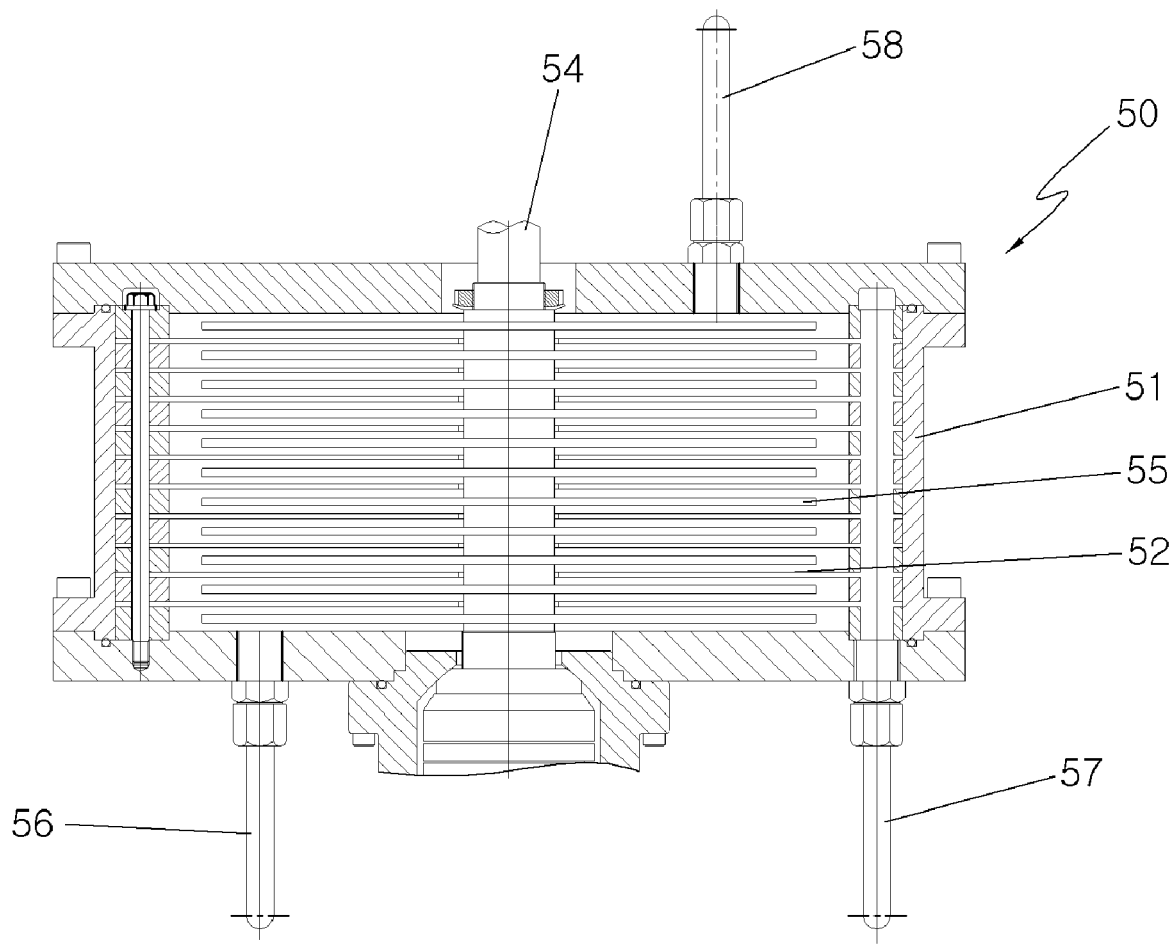
FIG. 9 is a sectional view of FIG. 8.

The shape of the support bracket 21 is formed as steering wheel and as illustrated in FIG. 7, and the support bracket 21 consists of a body having a cylindrical shape 210 and an orthotic having a cross-shape 220.

Therefore, when raw water containing various impurities inflows to a raw water inlet 18, the inside of barrels 13 is filled with raw water, and the purified water is discharged to the purified water outlet 19 and the concentrated water is discharged to the concentrated water outlet 20 passing through each membrane 14 installed inside the barrel 13.

The rotary rotor 17 is rotated by a driving motor 15 in order to prevent from blocking the pores deposited in the membrane 14 so that vortex is generated by the rotatory power from the rotary rotor 17 and enhances the filtering efficiency of the membrane 14 by removing the pollutants deposited in the membrane 14. Furthermore, when the ultrasonic vibrator 24 is operated in order to further enhance the filtering efficiency, additional pollutants that could not be removed by the vortex can be removed.

Moreover, the ultrasonic vibrator 24 in the exemplary embodiment of the present invention can be installed on one side of the membrane 14 and can be installed on two or more locations.

While the present discussion has been described in connection with what is presently considered to be the most practical and preferred embodiment, it is to be understood that the present invention is not limited to the disclosed example embodiments or to the drawings, but, on the contrary, encompasses various modifications and variations within the spirit and scope of the appended claims.

The invention claimed is:

1. A closed-type filtering apparatus employing a multistage rotor generating variable vortex flow in which introduced raw water for filtering is separated into purified/treated water and concentrated water to he discharged. the filtering apparatus comprising:

a closed-type barrel having a left lid unit and a right lid unit therein and forming a body of the filter apparatus;

a plurality of plate-type porous membranes installed spaced apart in an inner wall of the barrel and configured to filter the raw water;

a rotary shaft installed in a central portion of the barrel and connected to a driving shaft of a motor;

a plurality of rotary rotors of varying diameter installed spaced apart on the rotary shaft and alternatively arranged with the membrane, and configured to generate vortex;

a raw water inlet installed in the left lid unit;

a purified water outlet installed in the right lid unit;

a concentrated water outlet installed in the right lid unit;
a supporting bracket installed at a predetermined distance and configured to prevent the rotary shaft from bending or drooping; and
a subsidiary bracket configured to support the barrel,
wherein the smallest diameter of rotary rotor is installed in the raw water inlet through Which the raw water inflows and the diameter of rotary rotor is gradually increased towards the concentrated water outlet.

2. The closed-type filtering apparatus employing the multistage rotor generating variable vortex flow as claimed in claim 1, wherein a plurality of rectangular vortex generating projection is formed in predetermined distance in outer direction of each rotary rotor.

3. The closed-type filtering apparatus employing the multistage rotor generating variable vortex flow as claimed in claim 1, wherein a plurality of triangular vortex generating projection is installed on circumference plate alternatively arranged to have one side of triangle faces top and another side faces down.

4. The closed-type filtering apparatus employing the multistage rotor generating variable vortex flow as claimed in claim 1, wherein a filter pack is comprised as single unified module compositing a supporting bracket, a subsidiary bracket, a rotary shaft, rotary rotor, a membrane, and a barrel, and a plural stages of filter packs is installed in a crossways direction to control the capacity of the filtering apparatus.

5. The closed-type filtering apparatus as claimed in claim 4, wherein the filter pack includes an ultrasonic vibrator installed at one or more sides of the filter pack by passing through the membrane, and the supporting bracket includes a service wire line to connect the ultrasonic vibrator with a ultrasonic oscillator.

6. The closed-type filtering apparatus as claimed in claim 1, wherein the membrane and the rotary rotor are perpendicular to the ground.

7. A closed-type filtering apparatus employing a multistage rotor generating variable vortex flow in which introduced raw water containing contaminants for filtering is separated into purified/treated water and concentrated water containing concentrated contaminants so as to be discharged, the filtering apparatus comprising:
a closed-type barrel having a left lid unit and a right lid unit therein and forming a body of the filter apparatus;
plural plate-type, porous membranes installed spaced apart in an inner wall of the barrel to filter the raw water;
a rotary shaft installed in a central portion of the barrel and connected to a driving shaft of a motor;
plural rotary rotors of varying diameter installed spaced apart on the rotary shaft and alternatively arranged with the membrane, and configured to generate vortex;
a raw water inlet installed the left lid unit:
a purified water outlet installed in the right lid unit;
a concentrated water outlet installed in the right lid unit,
a supporting bracket installed at a predetermined distance and configured to prevent the rotary shaft from bending or drooping;
a subsidiary bracket configured to support the barrel; and
a plurality of rectangular or triangular shape of vortex generating projections formed at a predetermined distance in an outer surface of circumference of the rotary rotor,
wherein the smallest diameter of rotary rotor is installed in the raw water inlet through which the raw water inflows and the diameter of rotary rotor is gradually increased towards the concentrated water outlet, and
wherein the triangular shape of vortex generating projection is alternatively arranged to have one side of triangle faces top and another side faces down, and
wherein the membranes and the rotary rotors are disposed perpendicular to the ground.

* * * * *